(12) United States Patent
Ishii et al.

(10) Patent No.: US 7,221,910 B2
(45) Date of Patent: May 22, 2007

(54) METHOD FOR TRANSFERRING DATA OBJECTS BETWEEN PORTABLE DEVICES

(75) Inventors: Atsushi Ishii, Vancouver, WA (US); Michael John Detlef, Vancouver, WA (US); Kenneth James Park, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 565 days.

(21) Appl. No.: 10/689,917

(22) Filed: Oct. 17, 2003

(65) Prior Publication Data

US 2005/0085188 A1    Apr. 21, 2005

(51) Int. Cl.
*H04B 7/00* (2006.01)

(52) U.S. Cl. .................. 455/41.2; 455/557; 455/556.1; 455/517; 455/426.1; 455/407; 709/202; 709/219; 370/329; 370/338; 370/349

(58) Field of Classification Search ............... 455/41.2, 455/556.1, 557, 558, 517, 426.1, 456.2, 407; 709/202, 219
See application file for complete search history.

(56) References Cited

U.S. PATENT DOCUMENTS

| | | | | |
|---|---|---|---|---|
| 4,928,274 A | * | 5/1990 | Gilhousen et al. | 370/326 |
| 5,493,105 A | * | 2/1996 | Desai | 235/375 |
| 5,835,862 A | * | 11/1998 | Nykanen et al. | 455/558 |
| 5,848,412 A | * | 12/1998 | Rowland et al. | 707/9 |
| 6,041,374 A | | 3/2000 | Postman et al. | |
| 6,070,793 A | * | 6/2000 | Reichl et al. | 235/375 |
| 6,157,954 A | * | 12/2000 | Moon et al. | 709/228 |
| 6,185,198 B1 | * | 2/2001 | LaDue | 370/329 |
| 6,311,214 B1 | | 10/2001 | Rhoads | |
| 6,412,689 B1 | | 7/2002 | Horiguchi et al. | |
| 6,685,093 B2 | * | 2/2004 | Challa et al. | 235/462.46 |
| 6,714,969 B1 | * | 3/2004 | Klein et al. | 709/219 |
| 6,978,939 B2 | * | 12/2005 | Russell et al. | 235/472.01 |
| 7,062,661 B1 | * | 6/2006 | Na | 713/300 |
| 2001/0044324 A1 | | 11/2001 | Carayiannie | |
| 2002/0071067 A1 | | 6/2002 | Yoshitoshi | |

FOREIGN PATENT DOCUMENTS

| | | |
|---|---|---|
| EP | 0537522 | 4/1993 |
| WO | WO 0157811 | 2/2000 |
| WO | WO 0227593 | 9/2000 |

* cited by examiner

*Primary Examiner*—Marceau Milord
(74) *Attorney, Agent, or Firm*—Robert D. Varitz, PC

(57) ABSTRACT

A method of optical bi-direction communication between mobile communication devices, wherein each mobile communication device has data storage locations, and wherein the mobile communication device includes an optical data capture mechanism, includes rendering, in one mobile communication device, data in a computer readable form; determining if the rendered data can be stored in a single data file; converting the rendered data to a graphic representation; and reading and storing the graphic representation with the optical capture mechanism of another mobile communication device.

6 Claims, 3 Drawing Sheets

METHOD FOR TRANSFERRING DATA OBJECTS BETWEEN PORTABLE DEVICES

FIELD OF THE INVENTION

This invention relates to communications between portable communication devices, and specifically to an optical link which may be implemented between two or more mobile communication devices.

BACKGROUND OF THE INVENTION

U.S. Patent Publication No. 20020071067, of Yoshitoshi, for Blacklight and; liquid crystal display apparatus using the same, published Jun. 13, 2002, discloses a scannable barcode display and methods for using the same, however, the reference does not disclose the use of a CCD camera as a dual use device on a cell phone, nor does it provide for the use of scanned data as intrinsic to the use and function of the cell phone.

U.S. Patent Publication No. 20010051915, of Ueno et al., for Data transfer system using mobile terminal and two-dimensional barcode, published Dec. 13, 2001, discloses a data transfer system using a mobile terminal and a two-dimensional barcode, and more particularly, a processing system, server, processing terminal, and communications terminal that can be used to pay for purchases and manage membership cards and admission tickets, and other services, however, the reference does not disclose the use of a CCD camera as a dual use device on a cell phone, nor does it provide for the use of scanned data as intrinsic to the use and function of the cell phone.

WO0227593, of Shin et al., for integrated customer management system and method using wireless barcode, priority date Sep. 29, 2000, discloses an invention that relates to a customer management system and method using LCD barcode displayed on mobile terminal, however, the reference does not disclose the use of a CCD camera as a dual use device on a cell phone, nor does it provide for the use of scanned data as intrinsic to the use and function of the cell phone.

EP0537522, of Fernböck, for Apparatus and method for collecting, possibly processing, storing and transmitting all kinds of data, priority date Apr. 21, 1993, describes an apparatus and method for collecting and manipulation data, wherein the collection terminal is housed in a unitary structure, however, the reference does not disclose the use of a CCD camera as a dual use device on a cell phone, nor does it provide for the use of scanned data as intrinsic to the use and function of the cell phone.

WO0157811, of Doherty et al., for Data Handling, priority date Feb. 2, 2000, describes a data handling device in the form of a mobile phone and a scanner of some unspecified type, including a RF connection between phone and mobile system which provides the ability to store scanned data at phone and forward to mobile system, however, the reference does not disclose the use of a CCD camera as a dual use device on a cell phone, nor does it provide for the use of scanned data as intrinsic to the use and function of the cell phone.

U.S. Patent Publication No. 20010044324 of Carayiannic et al., for Cellular Telephone, filed Dec. 8, 2000, describes a cell phone inputting an encoded business card, but does not disclose phone-to-phone information exchange.

U.S. Pat. No. 6,412,689, to Horiguchi et al., for Communication equipment and method for business card information interchange, granted Jul. 2, 2002, describes a capture mechanism, however, the reference does not disclose the use of graphical patterns for exchanging information optically.

U.S. Pat. No. 6,311,214, to Rhoads, for Linking of computers based on optical sensing of digital data, granted Oct. 30, 2001, describes a system wherein a printed object is encoded with plural-bit data. When such an object is presented to an optical sensor, the plural-bit data is decoded and used to establish a link to an internet address corresponding to that object, however, the reference does not disclose phone-to-phone information exchange.

U.S. Pat. No. 6,041,374, to Postman et al., for PCMCIA interface card for coupling input devices such as barcode scanning engines to personal digital assistants and palmtop computers, granted Mar. 21, 2000, describes the provision of a scanning mechanism which may be linked to a PDA or computer.

SUMMARY OF THE INVENTION

A method of optical bi-direction communication between mobile communication devices, wherein each mobile communication device has data storage locations, and wherein the mobile communication device includes an optical data capture mechanism, includes rendering, in one mobile communication device, data in a computer readable form; determining if the rendered data can be stored in a single data file; converting the rendered data to a graphic representation; and reading and storing the graphic representation with the optical capture mechanism of another mobile communication device.

It is an object of the invention to provide for the exchange of data objects between communications devices, such as camera-equipped portable devices, without requiring any other communication means that would increase the manufacturing cost.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

This invention allows a plurality of portable electronics devices within optical proximity, equipped with optical image capturing devices and image display devices, to exchange information by displaying and capturing graphical patterns, e.g., 2D barcodes, that represents the information, without requiring any other communication means linking the portable electronic devices.

Exchanging data objects between portable electronics devices using short-range wireless communication methods, such as Bluetooth™ and IrDA, is a well-known concept. For example, it allows transferring electronic business cards from one device to another. However, the use of such short-range communication mechanisms requires inclusion of a second transceiver in the portable electronic device.

Cellular phones and personal digital assistants (PDAs), collectively referred to herein as mobile communication devices (MCDs) equipped with a small CCD camera are becoming more common. An objective of this invention provide for data exchange between such camera-equipped portable devices, without requiring any other communication means which will increase the cost of manufacture.

Figure 1:
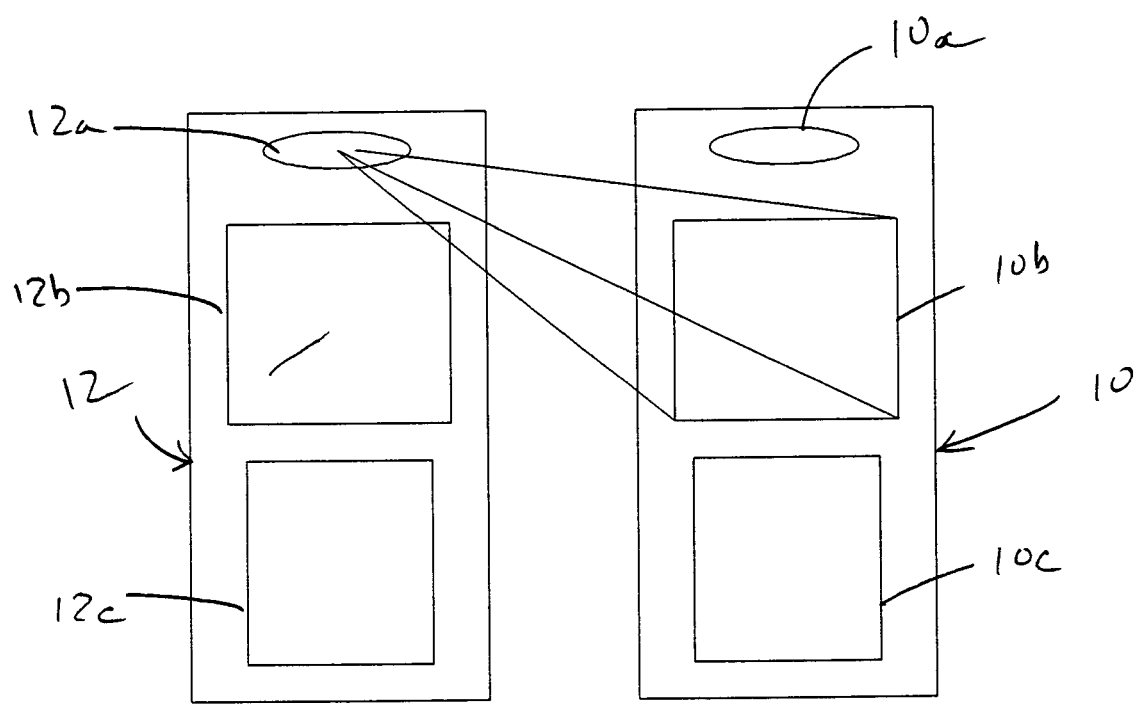
FIG. 1 depicts two portable electronic devices in an optical link configuration.

Referring to FIG. 1, the invention incorporates a data transfer protocol between a first portable device 10, having a CCD camera 10a, a display 10b, such as an LCD display, and a keypad 10c, and a second portable device 12, also having a CCD camera 12a, a display 12b, such as an LCD display, and a keypad 12c. The first example herein describes a one-way data transfer from device 10 to device 12. It will be appreciated by one of ordinary skill in the art that bi-directional transfer, which is described later herein, works in a similar manner. Device 10 displays a graphical pattern, e.g., a 2-dimensional bar-code, or a series of graphical patterns representing the encoded information to be exchanged, on display 10b, which data is optically captured by camera 12a of second portable device 12. Device 12 then processes the captured image and stores the decoded information into its memory.

Figure 2:
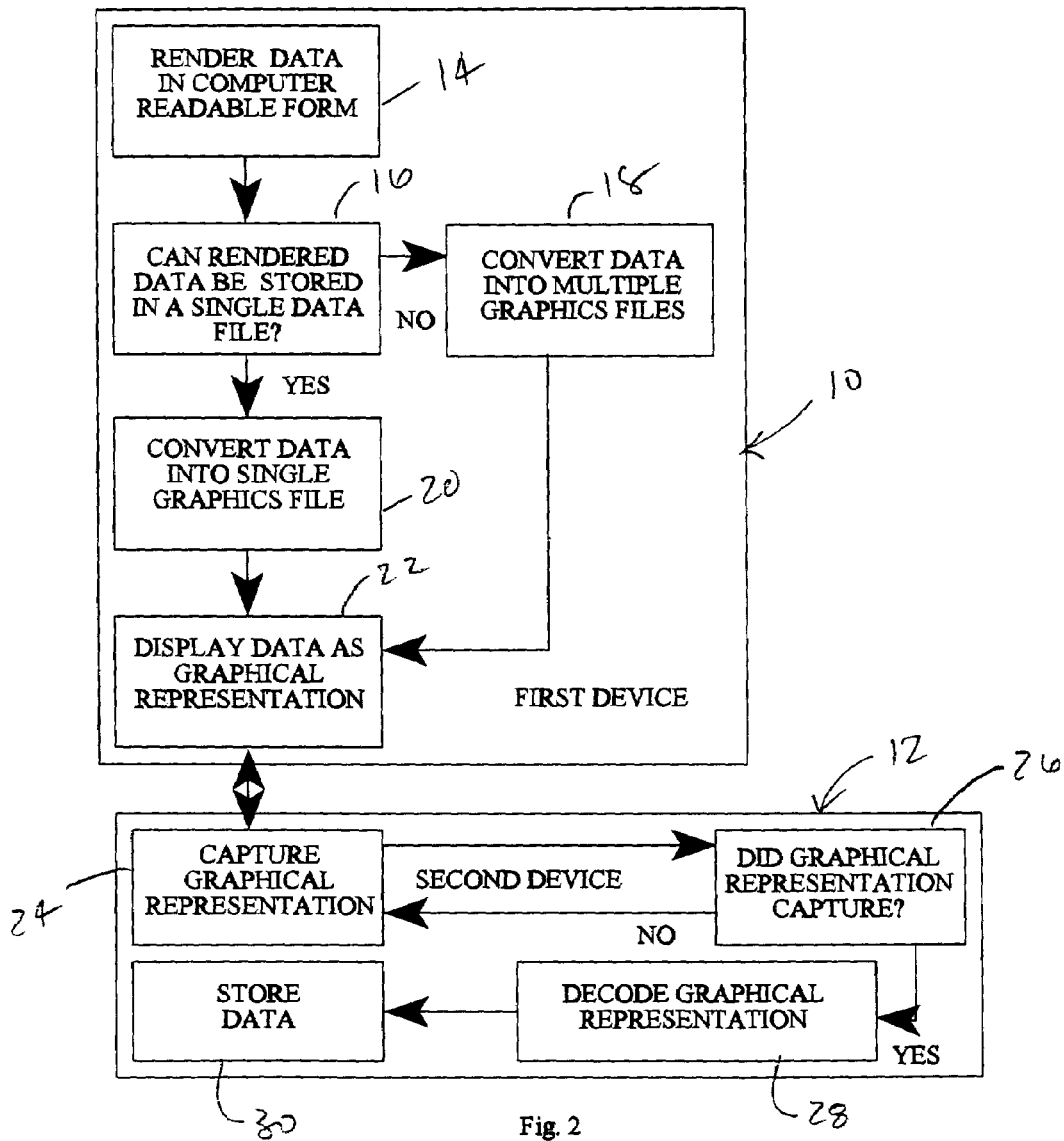
FIG. 2 is a block diagram of the method of the invention.

Referring now to FIG. 2, the method of the invention provides a bi-directional optical communications protocol for transferring data from one portable communication device (PCD) 10 to a second PCD 12, without the need for a hard-wire or RF communication connection. It will be understood by one of ordinary skill in the art that, although the data conversion portion of the protocol of the method of the invention is depicted in first device 10, and the data capture and storage portion of the protocol of the method of the invention is depicted in second device 12, both portions of the protocol are present in both devices, thus enabling bi-direction communication.

The data to be communicated to the other device is first rendered in computer readable form, block 14. The method of the invention determines if the optically rendered data can be stored in a single data file, block 16. If the data file is too large to fit into a single graphic file, NO to block 16, multiple associated graphics are used, and the data is converted into plural graphic files, block 18; otherwise, YES to block 16, the data is converted into a single graphic representation data file, block 20. In the method of the invention, the data is displayed as a graphical representation, block 22, e.g., bar-code or other graphical representation which is readable by the other device.

Once the data is rendered and graphically displayed on display 10a, MCD 12 then reads and stores the graphic representation by reading the graphic representation with the optical capture mechanism, specifically, CCD camera 12a can capture, block 24, an image of the graphic and store it for later processing. The method of the invention then determines whether the graphic representation is successfully captured, block 26. If the capture is not successful, NO to block 26, the graphic is read again, block 24, until the capture is successful, YES to block 24. This may be accomplished, in the case of multiple associated graphics, by informing the user that the nth of x total graphics was not decoded and the user should attempt to re-capture the nth graphic to complete the data file.

An algorithm of the method of the invention is applied to the stored graphic, to convert, or decode, block 28, the encoded data back to a format that is suitable for the MCD's data filling system. The data is then stored, block 30, in the MCD's data file location. A control process controls the CCD and the interpretation algorithm, and directs storage of the newly decoded data into the MCD's file system, or data storage location.

Figure 3:
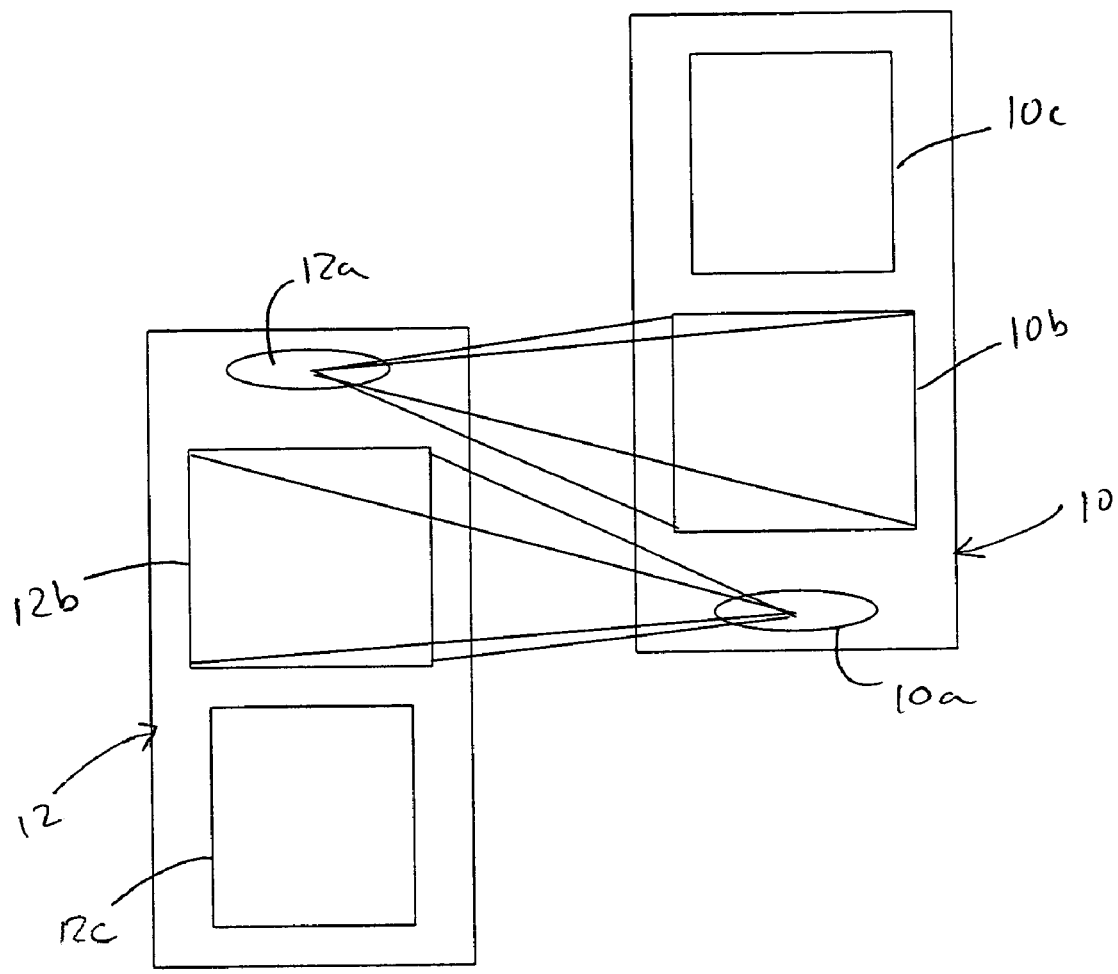
FIG. 3 depicts another embodiment of the portable electronic device of the invention in a bi-directional data transfer.

Referring now to FIG. 3, device 10 and device 12 are oriented so as to be able to perform a simultaneous, bi-directional data transfer, thus, when the camera and the display of two portable devices equipped with the technology of the invention are properly oriented, it is possible for the cameras of the portable devices to capture the display of the other device, thus providing bi-directional communication between the two devices. Using the bi-directional communication method of the invention, the two devices may conduct an "optical" hand-shake protocol, including synchronization, capability negotiation, acknowledgements and, when necessary, retransmissions. each device will follow the data handling protocol of FIG. 2 during bi-directional data transfer.

The method of the invention and communication devices equipped therewith may be used for a number of purposes. One purpose is the simple transfer of electronic business cards between the users of such devices. Another use is the transfer of notes, such as meeting notes, or class notes, between users.

Thus, a method for downloading data files between mobile communication devices via a bi-directional optical communication link has been disclosed. It will be appreciated that further variations and modifications thereof may be made within the scope of the invention as defined in the appended claims.

We claim:

1. A method of optical bi-direction communication between mobile communication devices, wherein each mobile communication device has data storage locations, and wherein the mobile communication device includes an optical data capture mechanism, comprising:
    rendering, in one mobile communication device, data in a computer readable form;
    determining if the rendered data can be stored in a single data file, and, if so, storing the data in a single data file; and if data cannot be stored in a single data file, converting the data to plural graphic representations and storing the data in plural data files;
    converting the rendered data to a graphic representation; and
    reading and storing the graphic representation with the optical capture mechanism of another mobile communication device.

2. The method of claim 1 wherein said storing includes:
    capturing the graphic representation;
    determining if the graphic representation is successfully captures;
    decoding the graphic representation; and
    storing the decoded graphic representation in the mobile communication device's data storage location.

3. The method of claim 2, which further includes, if the graphic representation is not successfully captured, reading the graphic representation until capture is successful.

4. A method of optical bi-direction communication between mobile communication devices, wherein each mobile communication device has data storage locations, and wherein the mobile communication device includes an optical data capture mechanism, comprising:
    rendering, in one mobile communication device, data in a computer readable form;
    determining if the rendered data can be stored in a single data file, and, if so, storing the data in a single data file;

converting the rendered data to a graphic representation;
reading the graphic representation with the optical capture mechanism in an other mobile communication device;
capturing the graphic representation;
determining if the graphic representation is successfully captured;
decoding the graphic representation; and
storing the decoded graphic representation in the mobile communication device's data storage location.

5. The method of claim 4 which further includes, if data cannot be stored in a single graphic file, converting the data to plural graphic representations and storing the data in plural data files.

6. The method of claim 4 which further includes, if the graphic representation is not successfully captured, reading the graphic representation until capture is successful.

* * * * *